Jan. 27, 1925.  W. D. KYLE  1,524,141
RACK
Filed Oct. 5, 1921   2 Sheets-Sheet 1
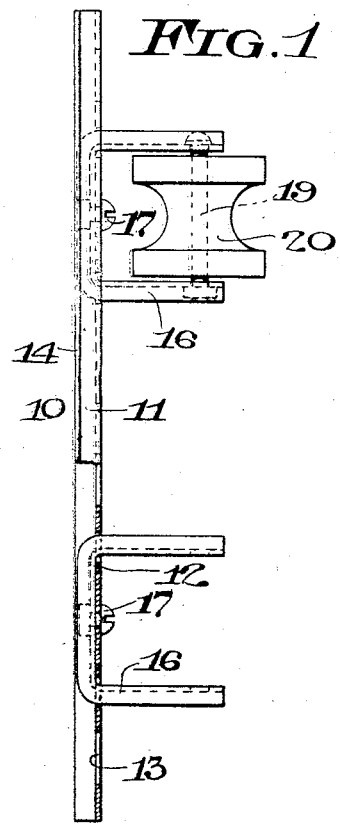
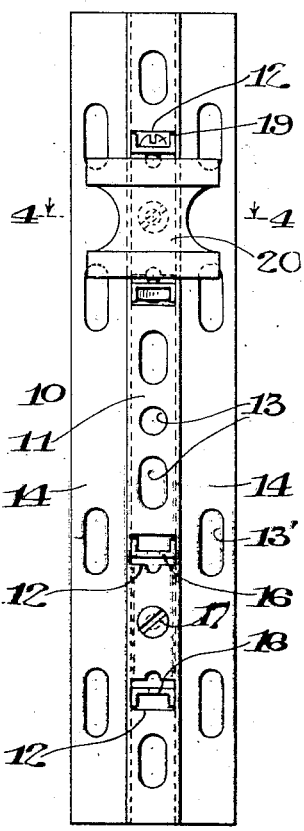
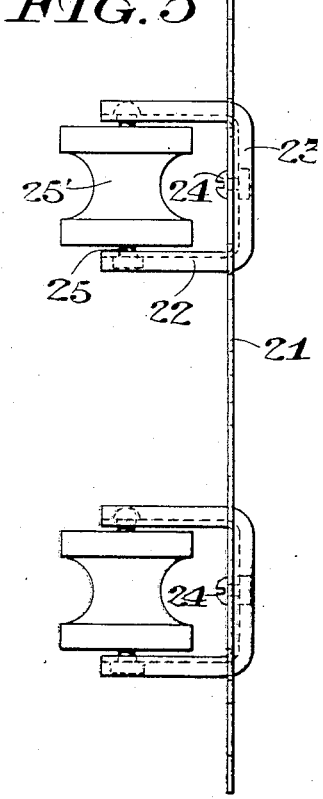
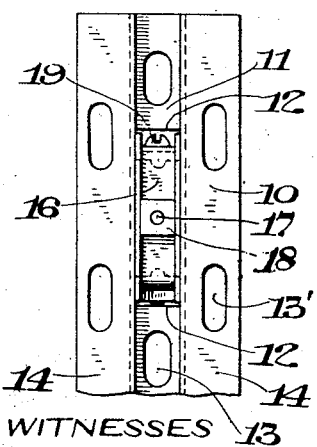
INVENTOR
William D Kyle
ATTORNEY Jan. 27. 1925.   W. D. KYLE   1,524,141
RACK
Filed Oct. 5, 1921   2 Sheets-Sheet 2

Patented Jan. 27, 1925.

1,524,141

UNITED STATES PATENT OFFICE.

WILLIAM D. KYLE, OF MILWAUKEE, WISCONSIN.

RACK.

Application filed October 5, 1921. Serial No. 505,461.

*To all whom it may concern:*

Be it known that I, WILLIAM D. KYLE, a citizen of the United States, and resident of Milwaukee, in the county of Milwaukee and State of Wisconsin, have invented new and useful Improvements in Racks, of which the following is a description, reference being had to the accompanying drawings, which are a part of this specification.

The invention relates to racks for insulators.

One of the objects of the invention is to provide a rack for spool insulators made up for the most part of metal stampings assembled together to form a strong construction capable of resisting the strains imposed on it by the line wires carried by the insulators.

A further object of the invention is to provide a rack having a base member provided with a channel and U-shaped channel brackets passing through slots in said channel and secured thereto, the spaced arms of each bracket carrying a rod upon which a spool insulator is mounted.

The invention further consists in the several features hereinafter set forth and more particularly defined by claims at the conclusion hereof.

Figure 8:
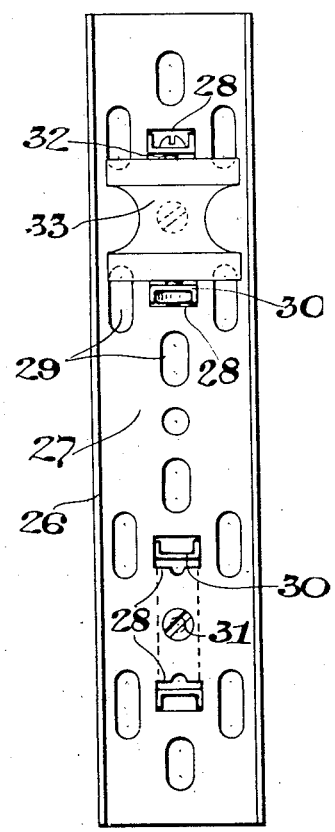

In the drawings: Fig. 1 is a side view of a rack embodying the invention, parts being shown in section; Fig. 2 is a front view of this rack; Fig. 3 is a detail back view thereof; Fig. 4 is a section taken on the line 4—4 of Fig. 2; Fig. 5 is a side view of a modified form, and Fig. 6 another modified form of the invention, parts being shown in section; Fig. 8 is a front view of this modified form and Fig. 9 an end view thereof.

Referring to Figs. 1 to 4, inclusive, the rack includes a base member 10 having a centrally disposed outwardly projecting channel 11 formed therein. The transverse portion of this channel is provided with one or more sets of transversely extending slots 12 and openings 13. The side portions 14 of this member are provided with openings 13'. The openings 13 and 13' are provided to receive fastening devices, such as bolts, U-bolts or screws to secure the base to a building or pole or the cross arm of a pole. The slots 12 are adapted to receive the arms of the U-shaped channel member 16, the side flanges of this channel member abutting or lying close to the sides of channel 11 to prevent the bracket turning with respect to the base and to brace the bracket. The transverse portion of each bracket abuts against the inner side of the transverse portion of the channel 11 and is secured thereto to prevent displacement, either by welding or by a bolt 17 having its nut 18 seated in the channel of the member 16. The depth of the channel of the bracket 16 is preferably such as to bring its outer edge flush with or slightly back from the plane of the side portions of the base member. The flanges of this channel extend outwardly so that the web of the channel abuts against the base. Each bracket has holes in the outer ends of its arms receiving a rod or bolt 19 upon which a spool insulator 20 is mounted. Both the base member and brackets in this construction may be readily formed of sheet metal stampings.

In the construction shown in Figs. 5 and 6 I provide a flat plate 21 forming a base with spaced openings through which the arms 22 of the U-shaped channel brackets 23 are passed, these brackets being similar to the brackets 16 and similarly secured to the plate 21 by bolts 24. Each bracket 23 carries a bolt 25 upon which a spool insulator 25' is mounted. Both the base and brackets are stamped out of sheet metal.

Figure 7:
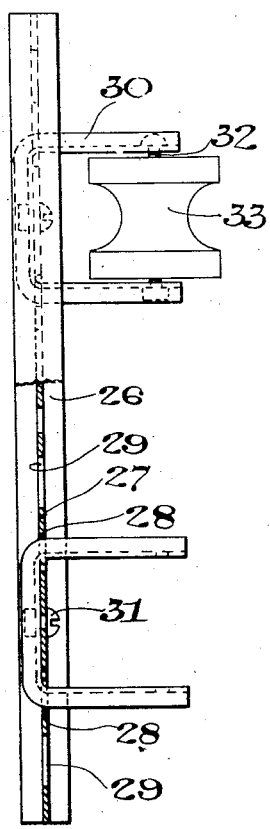
Figure 9:
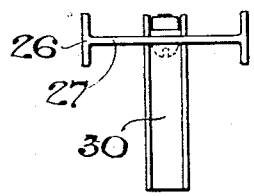

In the construction shown in Figs. 7 to 9, inclusive, the base member 26 is of I-beam formation, the web 27 of which is provided with pairs of transverse slots 28 and openings 29. The openings 29 are provided to receive fastening devices securing the rack to its support. The slots 28 are adapted to receive the arms of a U-shaped channel bracket 30 similar to the bracket 16 and similarly secured to the web by a bolt 31 or by welding. The arms of each bracket 30 carry a bolt 32 upon which a spool insulator is mounted. In this instance the brackets 30 are sheet metal stampings.

If desired, the bolts 17, 24 and 31 and the welding connections heretofore referred to may be dispensed with and the engagement of the transverse portion of the bracket against the support to which the rack is connected may be relied upon to keep the bracket in place, the base, in this instance, with its attaching means coacting with the support to clamp the bracket in position against longitudinal movement, and the arms of the bracket by their close fit in the openings in the base preventing lateral movement. It will also be understood that the arms of the bracket may be of different lengths in order that the line wire will clear any obstructions adjacent the rack.

What I claim as my invention is:

1. In a rack for insulators, the combination of a base member having spaced slots, a U-shaped bracket of channel cross section with its arms extending through said slots, means connecting the transverse portion of said bracket to said base member, an insulator support carried by the spaced arms of the bracket, and a spool insulator mounted on said support.

2. In a rack for insulators, the combination of a base member having an elevated web portion provided with spaced slots, a U-shaped bracket of channel cross section with its arms extended through said slots, means connecting the transverse portion of said bracket to said base member, an insulator support carried by the spaced arms of the bracket, and a spool insulator mounted on said support.

3. In a rack for insulators, the combination of a base having an elevated web portion provided with spaced slots, a U-shaped bracket with its arms extending through said slots, means connecting the transverse portion of said bracket to said base member, an insulator-carrying member carried by the arms of the bracket, and a spool insulator mounted on said member.

4. In a rack for insulators, the combination of a base having flat sides and an intermediate channel with the web outwardly spaced from said sides and provided with spaced slots, a U-shaped bracket of channel cross section with its arms extending through said slots and its web facing inwardly with the transverse portion thereof abutting the web portion of said intermediate channel, means connecting the bracket to the base member, an insulator-carrying member supported by said arms, and an insulator mounted on said member.

5. In a rack for insulators, the combination of a base having flat sides and an intermediate channel with its web outwardly spaced from said sides and provided with spaced slots, a U-shaped bracket of channel cross section with its arms extending through said slots and in its web facing inwardly with the transverse portion thereof abutting the web portion of said intermediate channel and the side flanges of the bracket fitting closely the sides of the intermediate channel, means connecting the bracket to the base member, an insulator-carrying member carried by the arms of the bracket, and a spool insulator mounted on said member.

6. In a rack for insulators, the combination of a base member having spaced slots, a U-shaped bracket with its arms extending through said slots, an insulator-carrying member carried by the arms of the bracket, and a spool insulator mounted on said member.

7. In a rack for insulators, the combination of a base member having spaced slots, a U-shaped bracket of channel section with its arms extending through said slots, an insulator support carried by the spaced arms of the bracket, and a spool longitudinally mounted on said support.

8. In a secondary rack, a base member having a pair of openings formed therein, a U-shaped insulator support having its base parallel to said base member and passing through said openings, and a supporting rod passing through both arms of said U-shaped insulator support.

In testimony whereof, I affix my signature.

WILLIAM D. KYLE.